United States Patent [19]

Tateishi

[11] Patent Number: 4,890,277
[45] Date of Patent: Dec. 26, 1989

[54] CARRIAGE DRIVING APPARATUS FOR A DISK PLAYER

[75] Inventor: Kiyoshi Tateishi, Saitama, Japan

[73] Assignee: Pioneer Electronic Corporation, Tokyo, Japan

[21] Appl. No.: 260,087

[22] Filed: Oct. 18, 1988

[30] Foreign Application Priority Data

May 24, 1988 [JP] Japan .................. 63-126152

[51] Int. Cl.$^4$ .............................................. G11B 21/02
[52] U.S. Cl. .................................................. 369/219
[58] Field of Search .............. 369/43, 44, 39, 32, 369/219, 220, 221; 760/77.03

[56] References Cited

U.S. PATENT DOCUMENTS 4,323,997  4/1982  Kuribayashi et al. ............... 369/219
4,559,570  12/1985  Schwartz .......................... 360/77.03

Primary Examiner—Donald McElheny, Jr.
Attorney, Agent, or Firm—Sughrue, Mion, Zinn, Macpeak & Seas

[57] ABSTRACT

A carriage driving apparatus for a disk player in which the stability and responsiveness of the feedback loop are improved. The carriage driving apparatus includes a driving coil disposed in a magnetic path extending in the radial direction of a disk for driving a carriage carrying a pickup in the forward/backward direction of the magnetic path in response to a driving current, a velocity detecting coil disposed in the magnetic path for generating a velocity detection output in accordance with changes in flux, and velocity detection correcting device, including a leakage correction equalizer and arithmetic circuit, for correcting the detection output of the velocity detecting coil in accordance with the frequency and intensity of the driving current flowing in the driving coil.

5 Claims, 5 Drawing Sheets

CARRIAGE DRIVING APPARATUS FOR A DISK PLAYER

BACKGROUND OF THE INVENTION

In some recording medium playing apparatuses such as a video disk player or the like in order to rapidly move a pickup carrying and supporting carriage, a linear motor is used to drive the carriage.

FIG. 5 is a partially sectional perspective view illustrating an example of a carriage driven by a linear motor, in which a pickup 1 for optically reading a recorded signal from a track of a disk (not shown) is supported and carried by a carriage 2. The carriage 2 is arranged to move along a pair of guide rails 3a and 3b extending in the radial direction of the disk.

A driving coil 11 and velocity detecting coil 12 are fixedly mounted on opposed ends of the carriage 2. The driving coil 11 has an iron core constituted by a center yoke of a magnetic circuit 13 disposed parallel to the guide rail 3a with the driving coil 11 being movable along the center yoke. The magnetic circuit 13 includes a pair of permanent magnets disposed, for example, inside the yoke in opposition to each other with the driving coil 11 interposed therebetween. Thus, an electromagnetic force in the forward or backward direction (depending on the direction of the driving current) is generated when the driving current is supplied to the driving coil 11. The velocity detecting coil 12 moves along a yoke of a magnetic circuit 14 extending parallel to the guide rail 3b, the coil 12 interlinking with the flux of the magnetic circuit 14 so as to obtain an electromotive force corresponding to its velocity of movement. This electromotive force is used for velocity control purposes and the like as a velocity detection output. The driving coil 11 and the magnetic circuit 13 constitute a linear motor 10. The magnetic circuit 13 and the magnetic circuit 14 constitute magnetic paths.

The linear motor 10 is driven by a driving circuit such as shown in FIG. 6.

In FIG. 6, a control signal is supplied from a carriage movement control circuit (not shown) to a driving amplifier 22 through a subtractor 21. The control signal is power-amplified by the driving amplifier 22 and supplied to the driving coil 11 as a driving current. When the driving current is supplied to the driving coil 11, an electromagnetic force corresponding to the level of the driving current is generated so as to move the carriage 2. With the movement of the carriage 2, an electromotive force is generated in the velocity detecting coil 12. The above-mentioned electromotive force corresponding to the velocity of the carriage 2 is amplified by an amplifier 23 so as to provide a velocity output having a proper level, the velocity output being supplied to a negative input terminal of the subtractor 21 through a velocity equalizer 24. The velocity equalizer 24 is provided to adjust for the change in frequency characteristic of the signal as well as for the change in phase of the signal which are caused by the interposition of a magnetic circuit in the feedback loop. In the subtractor 21, the above-mentioned velocity output is negatively fed back and subtracted from the control signal. By the use of such a velocity feedback circuit, a differential component of the first order is added to the transfer characteristic of the linear motor 10 to thereby improve its response characteristic.

The above-mentioned velocity output can be measured by a circuit arrangement such as shown in FIG. 7. That is, the carriage 2 is made movable, and a driving current of a predetermined level is supplied from a variable frequency source 71 to the driving coil 11 to thereby move the carriage 2. The output of the velocity detecting coil 12 is amplified by he amplifier 23 with a predetermined gain.

The frequency characteristic of such a velocity output is shown in FIG. 9.

In FIG. 9, although the velocity output initially decreases with an increase of the frequency of the driving current, since the carriage 2 cannot continue to follow the increase, the decrease of the velocity output stops at about 20 Hz and, on the contrary, starts to increase when the frequency of the driving current exceeds about 100 Hz. Since the carriage 2 stops if the driving current frequency reaches about 10 to 20 Hz, the output of the velocity detecting coil 12 in a relatively high frequency band is noise dependent on the carriage velocity. The dotted line in FIG. 9 indicates a velocity output characteristic desirable for a feedback circuit.

FIG. 10 shows the phase change characteristic of the velocity output. The phase delay of the velocity relative to the driving current increases with increasing frequency of the driving current.

The velocity output is negatively fed back to the input side through the above-mentioned velocity equalizer 24. The characteristic at relatively low frequencies is shown in FIG. 9, and the phase change of the velocity output is large, as shown in FIG. 10.

With respect to stability surplus, that is, the gain surplus and the phase surplus of the feedback control system, which is an index of the servo operating range in which the feedback loop is prevented from oscillating, it is preferable to set the loop frequency, for example, not higher than 10 Hz. In this range, however, the band of the feedback loop is so narrow that a high degree of responsiveness is no longer possible.

In a video disk player or the like, on the other hand, in the case of special reproduction in which play is carried out in repetitive jumps over predetermined numbers of tracks, or in the case of so-called multi-jump in which jumping over a plurality of tracks is performed, good responsiveness is required in the operation of the carriage, and therefore it is desired to improve the above-mentioned velocity output characteristic.

SUMMARY OF THE INVENTION

It is therefore an object of the present invention to provide a carriage driving apparatus for a disk player in which the stability and responsiveness of the feedback loop are improved.

In order to attain the foregoing and other objects, according to the present invention, a carriage driving apparatus for a disk player is provided comprising a driving coil disposed in a magnetic path extending in the radial direction of a disk for driving a carriage carrying a pickup in the forward/backward direction of the magnetic path in response to a driving current, a velocity detecting coil is disposed in the magnetic path for generating a velocity detection output in accordance with a change in flux, and velocity detection correcting means for correcting the detection output of the velocity detecting coil in accordance with the frequency and intensity of the driving current flowing in the driving coil.

DESCRIPTION OF THE PREFERRED EMBODIMENTS

Figure 9:
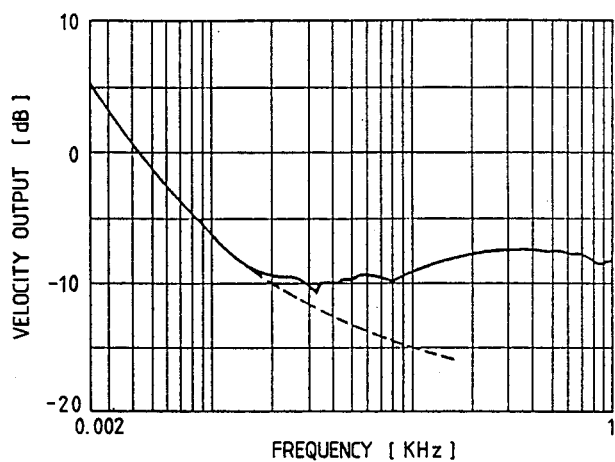
FIGS. 9 and 10 are diagrams for explaining a velocity output characteristic of a conventional device.
Figure 10:
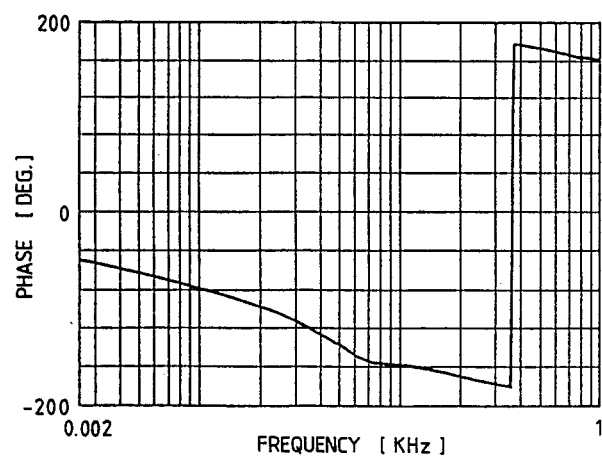

Preferred embodiments of the present invention will be described hereunder with reference to the drawings. First, the reason why a velocity output is generated in the velocity detecting coil 12 even in the frequency range where the carriage 2 does not move (FIG. 9) is considered that leakage flux from the driving coil 11 interlinks with the velocity detecting coil 12, that is, that the coils 11 and 12 are electromagnetically coupled.

Figure 7:
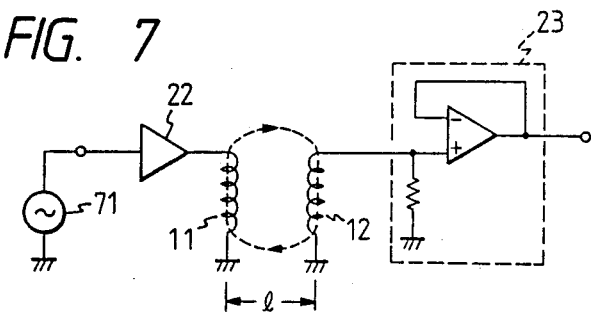
Figure 8:
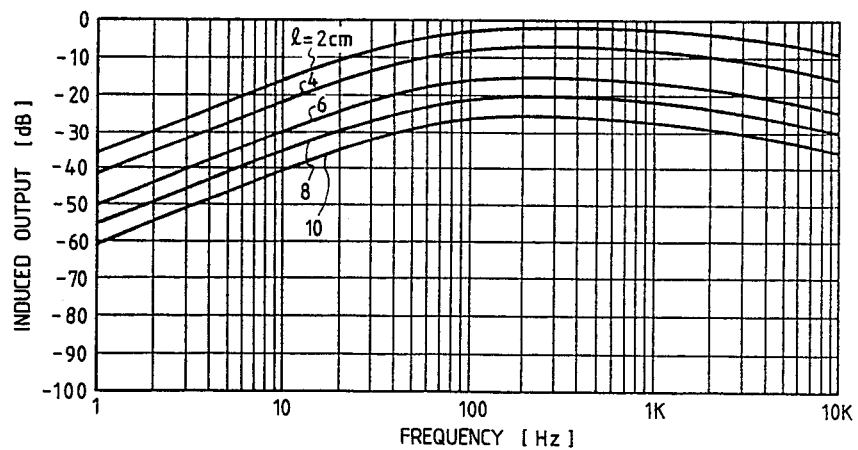
FIG. 8 is an explanatory diagram provided for explaining a leakage characteristic from a driving coil to a velocity detecting coil.

FIG. 8 shows the results of measurements taken of the output induced in the velocity detecting coil 12 due to the flux leaking from the driving coil 11 to the velocity detecting coil 12 in the arrangement of FIG. 7 with the carriage 2 held fixed. The frequency characteristic shown in FIG. 8 proves that the level becomes high with an increase of frequency and reaches its peak value at about 200 to 400 Hz, and that the narrower the distance 1 between the driving coil 11 and the velocity detecting coil 12 is made, the higher the induced voltage. Therefore, if the output component due to the leakage flux from the driving coil 11 to the velocity detecting coil 12 is cancelled from the velocity output, the noise component can be suppressed.

Figure 1:
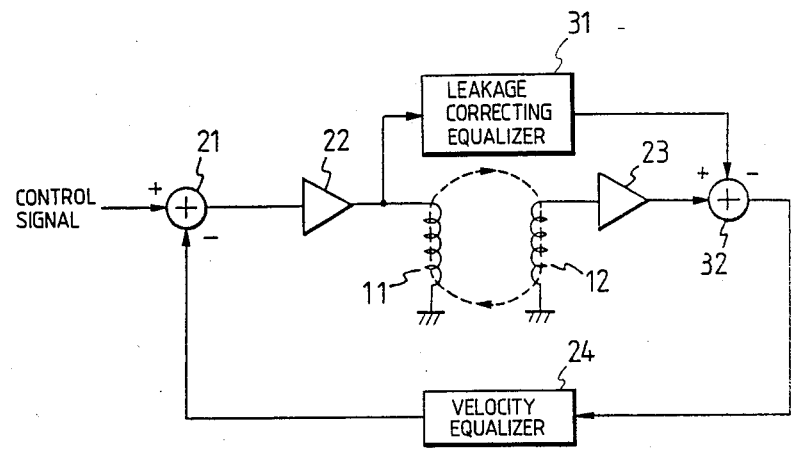
FIG. 1 is a block diagram illustrating a preferred embodiment of a carriage driving apparatus of the present invention.
Figure 6:
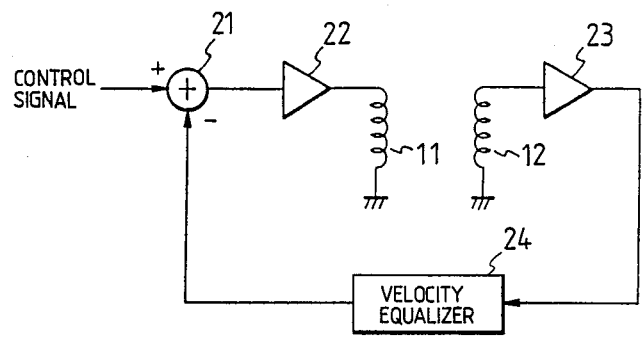
FIGS. 6 and 7 are block diagrams used for explaining the measurement of a velocity output characteristic.

FIG. 1 is a circuit diagram showing a preferred embodiment of the present invention. In FIG. 1, elements the same as or equivalent to those in the circuit shown in FIG. 6 are referenced correspondingly and a further detailed description thereof will omitted.

In FIG. 1, a driving current produced by the driving amplifier 22 is supplied to a leakage correcting equalizer 31 as well as the driving coil 11. The leakage correcting equalizer 31 has a frequency characteristic approximately the same as the characteristic of the above-mentioned leakage flux from the driving coil 11 to the velocity detecting coil 12 as shown in FIG. 8. When supplied with the driving current, the leakage correcting equalizer 31 produces a presumptive leakage output corresponding to the driving current. The output of the leakage correcting equalizer 31 is supplied to a negative input terminal of a subtractor 32 inserted between the amplifier 23 and the velocity equalizer 24. On the other hand, the output of the velocity detecting coil 12 is amplified by the amplifier 23, and the velocity output of the amplifier 23 including a noise component due to the above-mentioned leakage flux is supplied to a positive input terminal of the subtractor 32. Thus, the subtractor 32 produces a corrected velocity output in which the leakage flux component has been cancelled from the velocity output.

Depending on the polarity of coupling between the driving coil 11 and the velocity detecting coil 12, the subtractor 32 is used as an adder to thereby cancel the velocity output component due to the leakage flux. In this case, the arrangement of other parts is the same as the circuit shown in FIG. 6.

Figure 2:
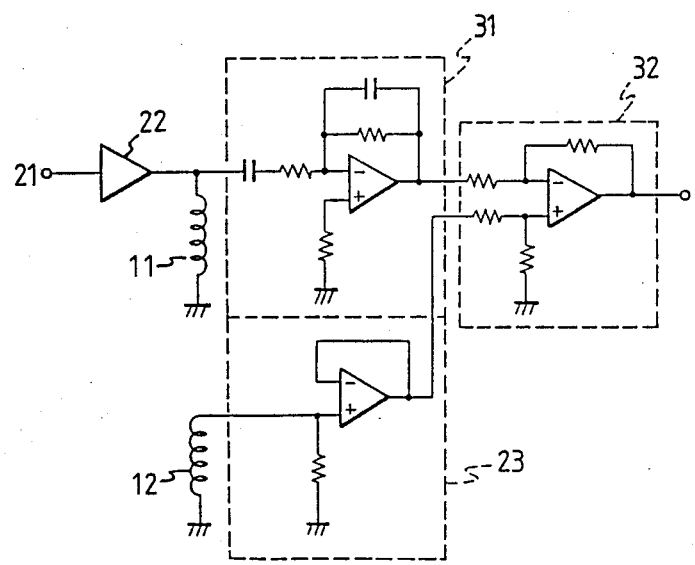
FIG. 2 is a circuit diagram illustrating a specific circuit arrangement of the embodiment shown in FIG. 1.

FIG. 2 shows an example of the arrangement of the leakage correcting equalizer 31 and the subtractor 32. In the circuit shown FIG. 2, elements the same as or equivalent to those in the circuit shown in FIG. 1 are referenced correspondingly.

The leakage correcting equalizer 31 is constituted by an operational amplifier and a RC circuit, and has a characteristic similar to a bandpass filter. Alternatively, the leakage correcting 31 may be constituted by a digital equalizer. The subtractor 32 is constituted by a well-known circuit using an operational amplifier in which the input of the leakage correcting equalizer 31 is maintained at a predetermined ratio with respect to the output of the amplifier 23 so as to obtain a corrected velocity output.

Figure 3:
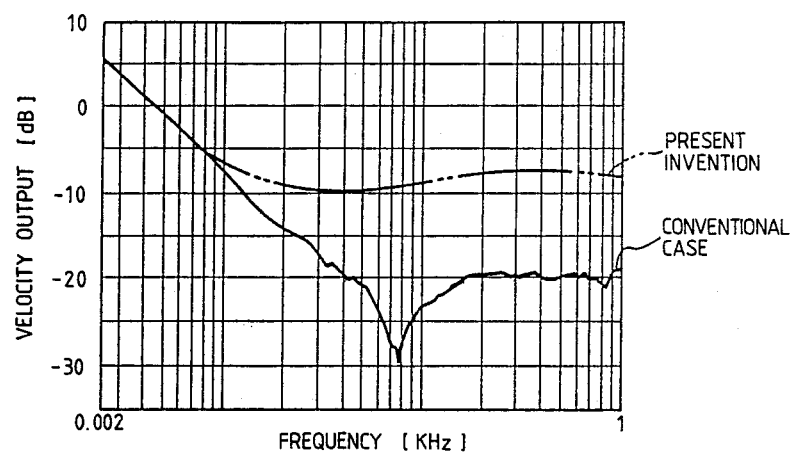
FIGS. 3 and 4 are characteristic diagrams illustrating corrected velocity output characteristics in the above embodiment.
Figure 4:
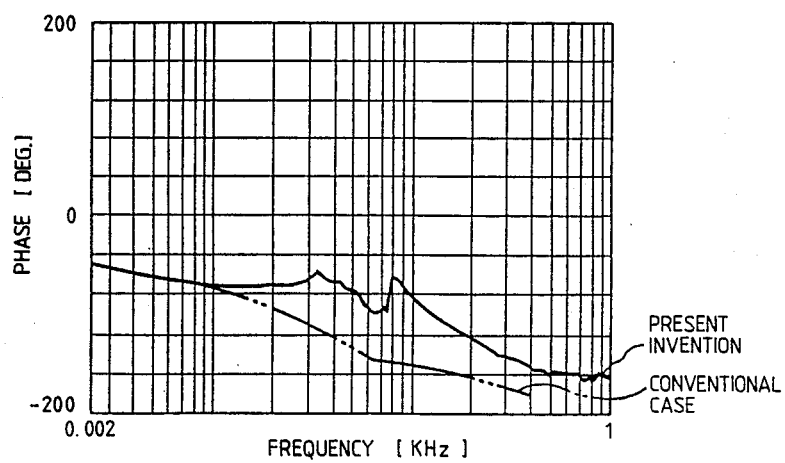
Figure 5:
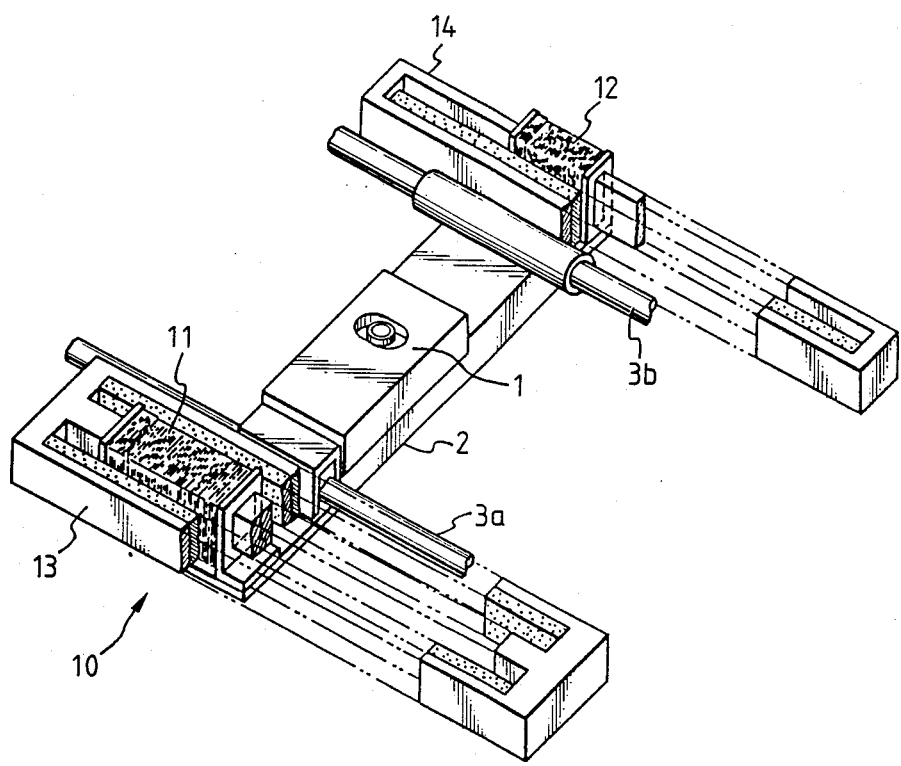
FIG. 5 is a partially sectional perspective view provided for explaining the construction of a carriage.

FIGS. 3 and 4 show the frequency versus velocity output characteristic and the frequency versus phase-change characteristic of the corrected velocity output obtained by cancelling a presumptive leakage output component corresponding to a driving current obtained by the leakage correcting equalizer 31 from the velocity detection output. The two dotted/broken lines in FIGS. 3 and 4 show the conventional characteristics.

As is apparent from FIG. 3, the characteristic of the velocity output has been improved so that the velocity output decreases linearly in the frequency range up to about 70 Hz, and the noise component is suppressed. For example, the velocity output is expanded from the conventional value of $-10$ db to $-17$ db at a frequency of 30 Hz, and from the conventional value of $-8$ db to $-20$ db at a frequency of 200 Hz. Thus, the gain surplus is increased.

As is apparent from FIG. 4, the phase change has been suppressed, for example, from the conventional value of $-110$ degrees to $-70$ degrees at a frequency of 30 Hz, and from the conventional value of $-170$ degrees to $-130$ degrees at a frequency of 200 Hz. Thus, the phase surplus is also increased correspondingly.

As has been described, the characteristics of the velocity output have been improved so that the stability surplus of the feedback system is increased to thereby make the servo operation more stable. Further, the allowable operating band of the feedback loop has been also widened so that the responsiveness of the carriage is also improved.

Moreover, the influence of the leakage flux from the driving coil 11 on the velocity detecting coil 12 is substantially cancelled by the above-described leakage correction so that the driving coil 11 and the velocity detecting coil 12 can be disposed closer to each other, contributing to the miniaturization of the carriage 2.

What is claimed is:

1. A carriage driving apparatus for a disk player, comprising: a carriage carrying a pickup; a driving coil disposed in a magnetic path extending in the radial direction of a disk for driving said carriage in the forward/backward direction of said magnetic path in response to a driving current; a velocity detecting coil disposed in said magnetic path for generating a velocity detection output in accordance with changes in flux;

and velocity detection correcting means for correcting said detection output of said velocity coil in accordance with the frequency and intensity of said driving current flowing in said driving coil.

2. The carriage driving apparatus for a disk player according to claim 1, wherein said velocity detection correcting means comprises an equalizer and an arithmetic operator, said equalizer comprising means for adjusting the level of said driving current on the basis of a gain characteristic corresponding to a coupling characteristic between said driving coil and said velocity detecting coil to thereby obtain a presumptive coupling output, said arithmetic operator comprising means for performing addition or subtraction between said presumptive output and said velocity detection output.

3. The carriage driving apparatus for a disk player according to claim 2, wherein said equalizer comprises an operational amplifier and an RC circuit coupled to said operational amplifier.

4. The carriage driving apparatus for a disk player according to claim 2, wherein said equalizer comprises a digital equalizer.

5. The carriage driving apparatus for a disk player according to claim 2, wherein said arithmetic operator comprises means for maintaining an input of said equalizer at a predetermined ratio with respect to said velocity detection output of said velocity detecting coil.

* * * * *